United States Patent [19]

Ichioka et al.

[11] Patent Number: 5,546,013
[45] Date of Patent: Aug. 13, 1996

[54] ARRAY TESTER FOR DETERMINING CONTACT QUALITY AND LINE INTEGRITY IN A TFT/LCD

[75] Inventors: Yoshikazu Ichioka, Fujisawa, Japan; Leslie C. Jenkins, Holmes, N.Y.; Shinichi Kimura, Sagamihara, Japan; Robert J. Polastre, Ossining, N.Y.; Ronald R. Troutman, Ridgefield, Conn.; Robert L. Wisnieff, Yorktown, N.Y.

[73] Assignee: International Business Machines Corporation, Armonk, N.Y.

[21] Appl. No.: 26,897

[22] Filed: Mar. 5, 1993

[51] Int. Cl.⁶ ........................................... G06F 7/02
[52] U.S. Cl. .......................... 324/770; 324/158.1
[58] Field of Search .................. 324/770, 73.1, 324/765, 158.1; 250/310; 365/98, 100, 87; 359/55, 57, 59; 371/25.1, 15.1, 22.1; 364/481

[56] References Cited

U.S. PATENT DOCUMENTS

| | | | |
|---|---|---|---|
| 4,175,253 | 11/1979 | Pitegoff | 324/754 |
| 4,290,013 | 9/1981 | Thiel | 324/158.1 |
| 4,342,959 | 8/1982 | Skilling | 324/158.1 |
| 4,801,869 | 1/1989 | Sprogis | 324/765 |
| 4,819,038 | 4/1989 | Alt | 324/765 |
| 4,843,312 | 6/1989 | Hartman et al. | 250/310 |
| 4,894,605 | 1/1990 | Ringleb et al. | 324/537 |
| 4,940,934 | 7/1990 | Kawaguchi et al. | 324/770 |
| 5,057,775 | 10/1991 | Hall | 324/770 |
| 5,072,175 | 12/1991 | Marek | 324/537 |
| 5,113,134 | 5/1992 | Plus et al. | 324/73.1 |
| 5,179,345 | 1/1993 | Jenkins et al. | 324/658 |
| 5,377,030 | 12/1994 | Suzuki et al. | 324/770 |

FOREIGN PATENT DOCUMENTS

| | | |
|---|---|---|
| 1130132 | 5/1989 | Japan . |
| 246726 | 10/1989 | Japan . |
| 9209900 | 6/1992 | WIPO . |

OTHER PUBLICATIONS

L. C. Jenkins et al., "Functional testing of TFT/LCD arrays" IBM Journal of Research and Development vol. 36, No. 1, Jan. 1992 pp. 59–68.

*Primary Examiner*—Vinh P. Nguyen
*Attorney, Agent, or Firm*—David Aker

[57] ABSTRACT

An apparatus for testing for and classifying defects in a TFT/LCD array having gate lines and data lines. Devices are provided for activating cells of the array by applying gate pulses to the gate lines and pulses to the data lines. Devices are also provided for acquiring waveforms from data lines of the array. Additional devices sample the waveforms at selected points in time. A computer may be used to classify the waveforms to indicate whether defects are present and if present, the nature of the defects by comparing voltages of the waveform at the selected points in time.

4 Claims, 10 Drawing Sheets

FIG. 14 ARRAY TESTER CONTROL SEQUENCE INTERLEAVE OPERATION 3,546,013

ARRAY TESTER FOR DETERMINING CONTACT QUALITY AND LINE INTEGRITY IN A TFT/LCD

CROSS REFERENCE TO RELATED APPLICATION

This application is related to U.S. patent application Ser. No. 07/450,635 of Jenkins and Wisnieff filed on Dec. 13, 1989, now U.S. Pat. No. 5,179,345 the entire disclosure of which is hereby incorporated by reference.

TECHNICAL FIELD

This invention relates to electrical testers. More particularly it relates to a method and apparatus for electrical testing of a thin film transistor liquid crystal array (TFT/LCD).

BACKGROUND ART

The array tester described in U.S. Pat. No. 5,179,345 provides a means for comprehensively testing every cell in a TFT/LCD array using only the array's edge connections. The basic test performed by the array tester is to write charge onto a cell (by properly biasing the gate and data lines), store charge on the cell by biasing the gate off, read the remaining charge off of the cell by connecting a charge integrating circuit to the data line and biasing the gate line on, and then measure the charge that has been transferred to the charge integrating circuit to determine the final value of charge.

Electrically testing the charge arrays inherent to TFT/LC displays at any stage prior to the attachment of line drivers requires contacting a large number of pads (typically in the thousands). Contamination (such as residual photoresist, oxide films, etc.) and the substrate non-planarity can interfere with good electrical connection between the tester probes and the array pads. To insure validity of the many tests that write charge to, and read charge from, selected pixels, it is necessary to determine whether the tester probes are actually making contact to the array pads.

There are various mechanical ways to assure electrical contact to the pads. However, these require at least one of mechanical motion between the pads and the probes, the use of additional probes to determine the integrity of the electrical contact, or mechanical abrasion of the pads or gate lines. These procedures are expensive, time consuming and may themselves introduce possible sources of failure for the array under test. Thus, it is highly desirable that various electrical integrity checks can be made using only the probes normally required to contact the pads, and that these probes be used in the normal manner described in the above mentioned patent.

SUMMARY OF THE INVENTION

It is an object of the present invention to provide a method for determining contact quality to the pads in a TFT/LCD array.

It is another object of the invention to provide a method for determining the line integrity of gate lines and/or data lines in a TFT/LCD array.

It is a further object of the invention to identify specific types of defects in a TFT/LCD array by evaluating electrical waveforms obtained therefrom.

In accordance with the invention a TFT/LCD array is tested by applying drive pulses to a driven end of gate lines, observing the presence of a corresponding signature pulse on a first data line near the driven end and a second data line at the end opposite the driven end so as to indicate the gate line is continuous; testing successive gate lines in the same manner to determine the top most and bottom most continuous gate line; and evaluating integrity of all the data lines by using the top most and bottom most gate lines having integrity.

The invention also contemplates using data concerning integrity of gate lines and data lines to isolate at least one of defective lines and defective contacts to said lines.

In accordance with the invention a method for testing probe contact integrity to electrodes of a TFT/LCD array comprises the steps of providing an electrically conductive connection ring for the electrodes; providing an electrical connection between said connection ring and each of said electrodes; applying electrically conductive probe contacts to at least two of said electrodes; applying a voltage between said at least two probe contacts; and measuring the current between said at least two contacts to determine the quality of electrical continuity between said probe contacts and said electrodes. The electrical connection is made by a high resistance element.

The invention further contemplates a method for testing for probe contact integrity to electrode connection regions of a TFT/LCD array having gate lines and data lines comprising the steps of: providing adjacent a row of said connection regions a conductive line crossing said electrodes and insulated therefrom; providing a small capacitance between said line and each of said electrodes; placing a conductive probe in contact with each of said connecting regions; successively applying a voltage pulse to each of said connection regions through said probe; and observing the presence of a signature pulse on said line for each applied pulse to determine quality of electrical connection between said probe and said connection regions.

The invention also encompasses a method for testing a TFT/LCD array having data lines and gate lines comprising the steps of: applying a pulse to one of said gate lines: integrating a resulting signature pulse on successive ones of said data lines to obtain an integrated wave form and observing the integrated waveform to obtain information concerning at least of a level of functionality of said TFT/LCD and quality of contact to said lines.

DETAILED DESCRIPTION OF THE PREFERRED EMBODIMENT

Figure 1:
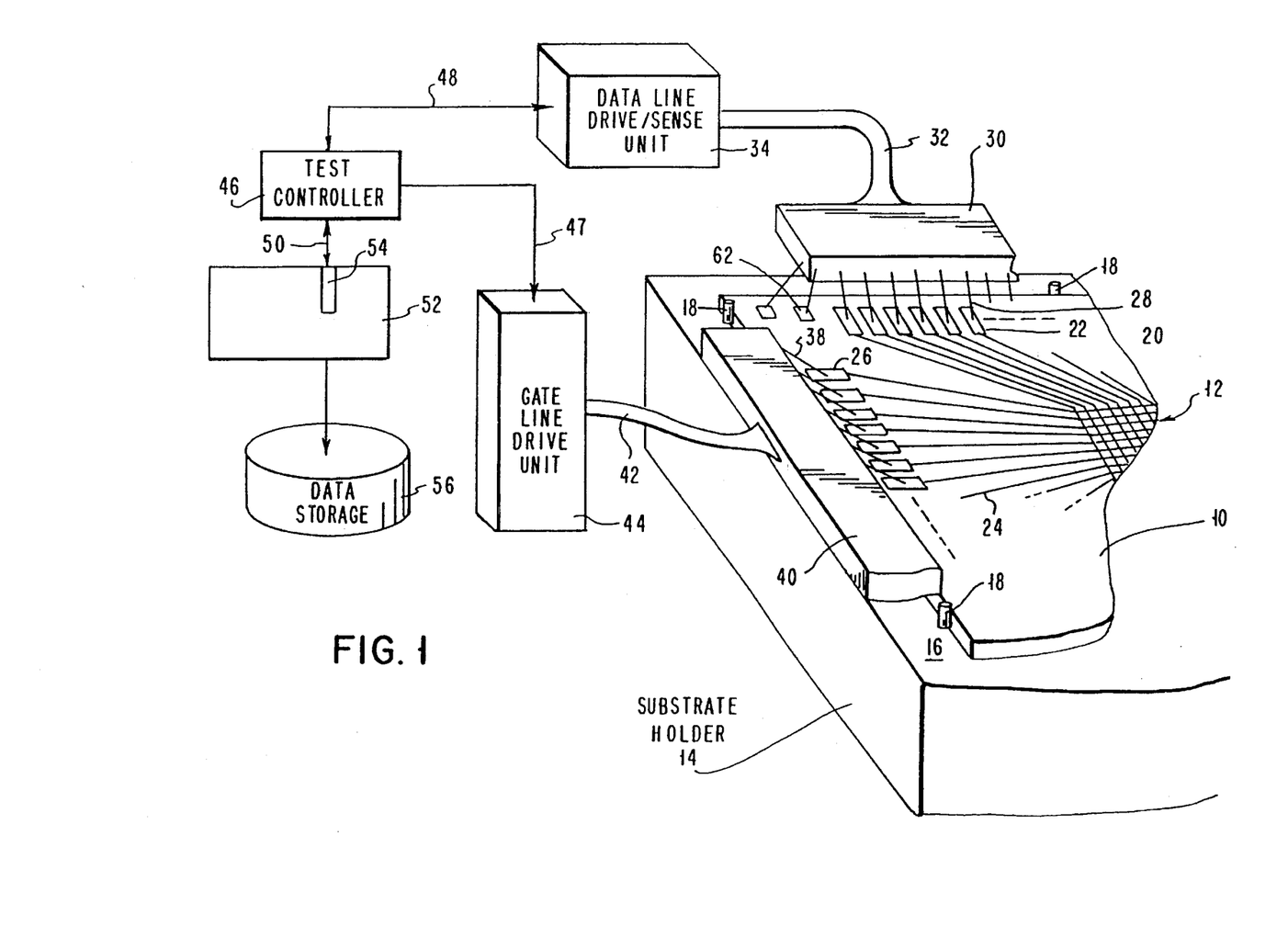
FIG. 1 is a partial schematic/partial perspective view of an array tester system in accordance with the invention using the methods described herein.

Referring to FIG. 1, a substrate 10 having formed thereon a TFT array 12 is supported on a substrate holder 14 having a upper planar surface 16 in a predetermined position by at least 3 alignment pins 18. Substrate 10 has a large number of data lines 20 for driving the TFT/LCD array. Each data line terminates in a data line electrode or data line pad 22. Also formed on substrate 10 are a large number of gate lines 24 each terminating in a gate line electrode or a gate line pad 26.

Each data line pad 22 is contacted by an electrically conductive testing probe 28 extending from data line probe holding fixture 30. A cable 32 connects each test probe 28 to a driving circuit within a data line drive/sense unit 34. Each gate line pad 26 is contacted by an electrically conductive probe 38 extending from a fixture 40. A cable 42 has wiring for connecting each probe 38 to a responsive gate line driver in a gate line unit 44. The manner of operation of date line drive/sense unit 34 and gate line drive unit 44 is described in detail in the above mentioned U.S. Patent to Jenkins and Wisnieff.

Data line drive/sense unit 34 and gate line drive unit 44 are controlled by a test controller 46. Controller 46 contains a series of latches, registers, memory buffers and control logic so that appropriate sequential activation of various gate lines 24 and data lines 20 occur. More specifically instructions on how to conduct a test such as voltages to be applied, lines to be activated, and time and length of activation are transferred to test controller 46. While controller 46 sequences the operation of circuitry within gate line drive unit 44 via a bus 47, interaction with data line driver/sense unit 34 is via a bi-directional bus 48. Specifically, there are provisions for obtaining signals from the data lines for analysis in the manner set forth below.

Test controller 46 is connected by a bi-directional bus 50 to a computer 52 by means of a standard digital interface board 54 located within computer 52. Computer 52 may be any one of a number of personal computers such as an IBM PS/2 model 80 with suitable software support for programming in the C language to accomplish the functions described below. Computer 52 is connected to a high volume data storage device 56, such as a magnetic disk array, in a manner well known in the art.

Figure 2:
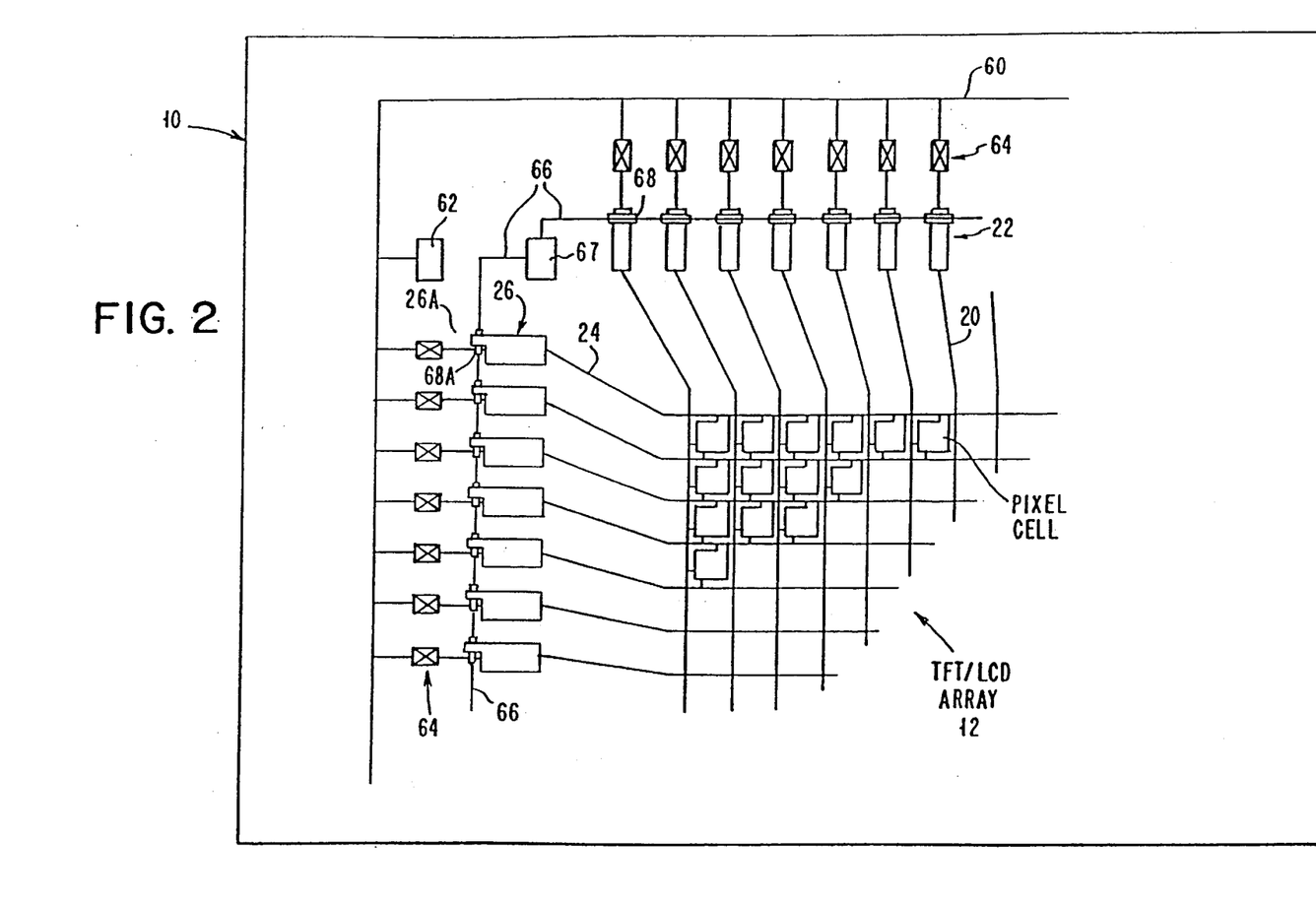
FIG. 2 is an enlarged, somewhat schematic plan view of a substrate containing a thin film transistor/liquid crystal display array.

Referring to FIG. 2 for additional detail of substrate 10 a connection ring 60 on the upper surface of substrate 10 forms a continuous conductive loop. Connection ring 60 is electrically connected to a connection ring contact or pad 62 so as to provide a convenient location for making electrical connection thereto. Each data line pad 22 and gate line pad 26 is electrically connected to connection ring 60 through an electrically resistive element 64. Element 64 is preferably a high resistance, such as a 1000 megohm thin film (silicon planar) resistor but may also be a pair of back to back diodes or a thin film transistor with connections which cause it to have the proper resistance. It will be understood by those skilled in the art that when the substrate 10 is assembled with a second substrate, spacers, liquid crystal material and a seal that the conductive connection ring 60 and resistive elements 64 may not be present. In other words, substrate 10 may be cut so as to remove these elements.

One method for checking probe contact to the array pads is to apply a DC voltage to a selected gate line or data line probe and measure the current flowing in the connection ring 60. A complete circuit is made with a probe which contacts pad 62. When the probe is making contact to the gate line or data line pad, one volt applied to the probe will result in approximately 1 nA of current flow in the connection ring. If the probe fails to make contact to the pad, negligible current (<1 pA) will flow.

A variation of this method, which eliminates the need for contacting shorting ring 60, is to measure the current flow between each adjacent pair of probes. If both probe contacts are good, the resulting current is approximately half that above since the current must now flow through two resistive elements 64 to be detected. If either probe is not contacting the pad, the current is again negligible. By comparing currents when consecutive probe pairs are measured, a bad contact (or contacts) is easily located. For example, if only two adjacent pairs exhibit negligible current, the probe common to both pairs is isolated as a bad contact, and, in general, n+1 consecutive bad pairs isolates n consecutive bad contacts. However, this variation cannot detect a single good probe contact sandwiched between two bad ones. This method will not detect poor contact between a gate line pad and its respective probe.

Substrate 10 of FIG. 2 also includes structure which permits using an alternative method for determining probe to pad contact quality. A test line 66, which may also be in the form of a conductive loop, is connected to a test pad 67. Line 66 is insulated from pads 22 by a series of insulators 68. Thus, a small capacitor is formed between each of pads 22 and line 66. Alternatively, as shown with respect to pads 26, an insulating layer or a series of discreet insulators 68A may be formed over line 66, and pads 26 may each have an extension 26A which extend over insulators 68A, thus forming a capacitor. In addition, the line 66 may be formed below insulators 68A and extensions 26A.

With this alternative structure test line 66 may be connected through pad 67 to a detector, of the kind described in the above mentioned patent, which can recognize the signature of a properly operating probe to pad contact. Thus, the quality of probe to pad contact can be checked, if desired, without the use of connection ring 60.

Conductive line 66 may also be located in the fan-out region of the gate and data lines, that is the region between pads 22 or 26 and the TFT/LCD array 12. In this case, through capacitors formed between a gate line or a data line and line 66, it is possible to ascertain whether there is an open in the region of the gate line or data line adjacent to its respective pad.

Figure 3:
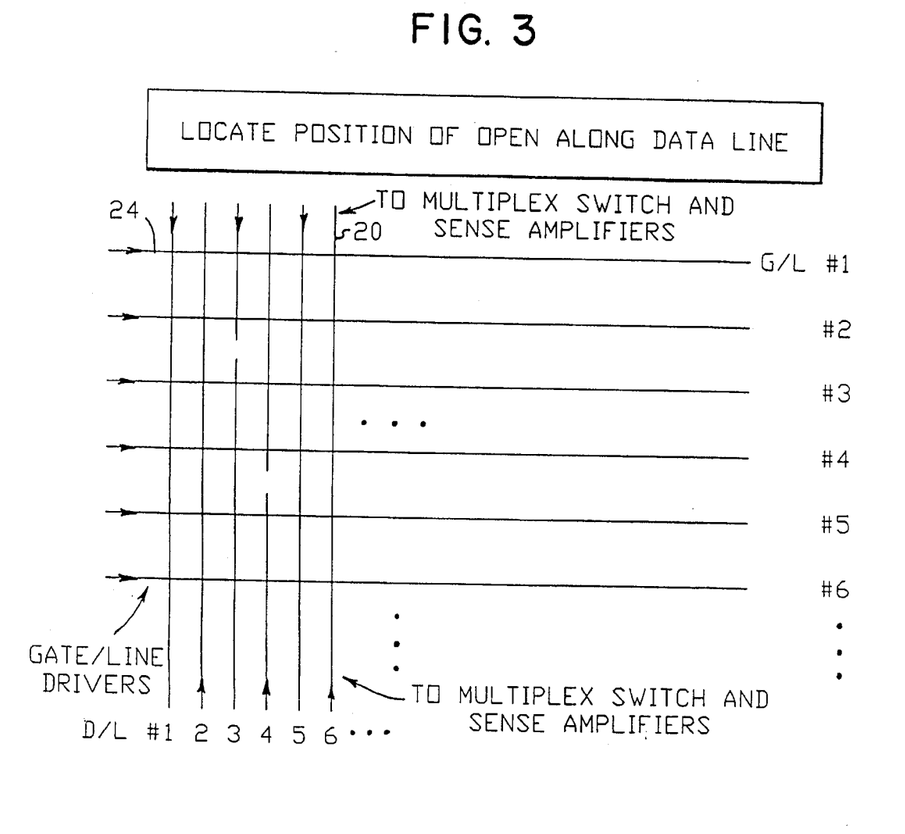
FIG. 3 illustrates a method for locating opens in data lines of the array of FIG. 2.

Referring to the somewhat schematic representation in FIG. 3, vertical data lines 20 run from pads on the top and bottom of the substrate. Gate lines 24 run horizontally from pads on the left and right edges. A thin film insulator isolates the gate and data lines where they cross over one another, forming an overlap capacitor. An electrical pulse can be applied to an individual gate line at its edge connector. This pulse is capacitively coupled to the data line and sensed by the circuitry connected to the data line. Many data lines dispersed across the display can be sampled in parallel and their waveforms analyzed. A normal waveform sensed at data lines crossing at each end of a gate line assures that the gate line is continuous. This procedure can be repeated for all of the gate lines. Two gate lines that have been identified as good, one near the top of the display and the other near the bottom, are then used for data line testing. All of the data lines are sensed in this case, and their contacts and continuity verified. Various failure mechanisms (shorting of lines, poor contact to the line, line breakage) can also be determined from this test, as more fully described below.

Thus, in FIG. 3 pulses are applied to the driven end of the gate lines. If the presence of a corresponding signature pulse on a first data line near a driven end and a second data line at the end opposite the driven end is observed, this indicates that the gate line that is continuous. Successive gate lines are tested in this manner to determine the top most and bottom most continuous gate lines. Finally, the integrity of all data lines is evaluated by using the top most and bottom most gate lines which have integrity. In FIG. 3 data lines 3 and 4 are identified as having opens by this method. Sense amplifiers of the type described in the above mentioned U.S. patent are connected to defective data line 3 and defective data line 4 and gate line pulse excitation is applied sequentially to gate lines starting from the top gate line. This is the normal excitation procedure and no special logic for determining the sequence of operation of the gate line drivers is required. The location of which data line response changes from normal to zero is noted to define the location of the open in the data line. For data lines sensed at the top (such as data line 3) the response changes from normal to zero after gate line 2 is deactivated while for data lines sensed at the bottom (such as data line 4) the response changes from zero to normal (as gate line 5 is activated).

As an alternative, if additional logic is available for controlling the order of gate line driver excitation there are any number of search algorithms which may be used to find the open location. One example is use of a Newton half interval algorithm.

Figure 4:
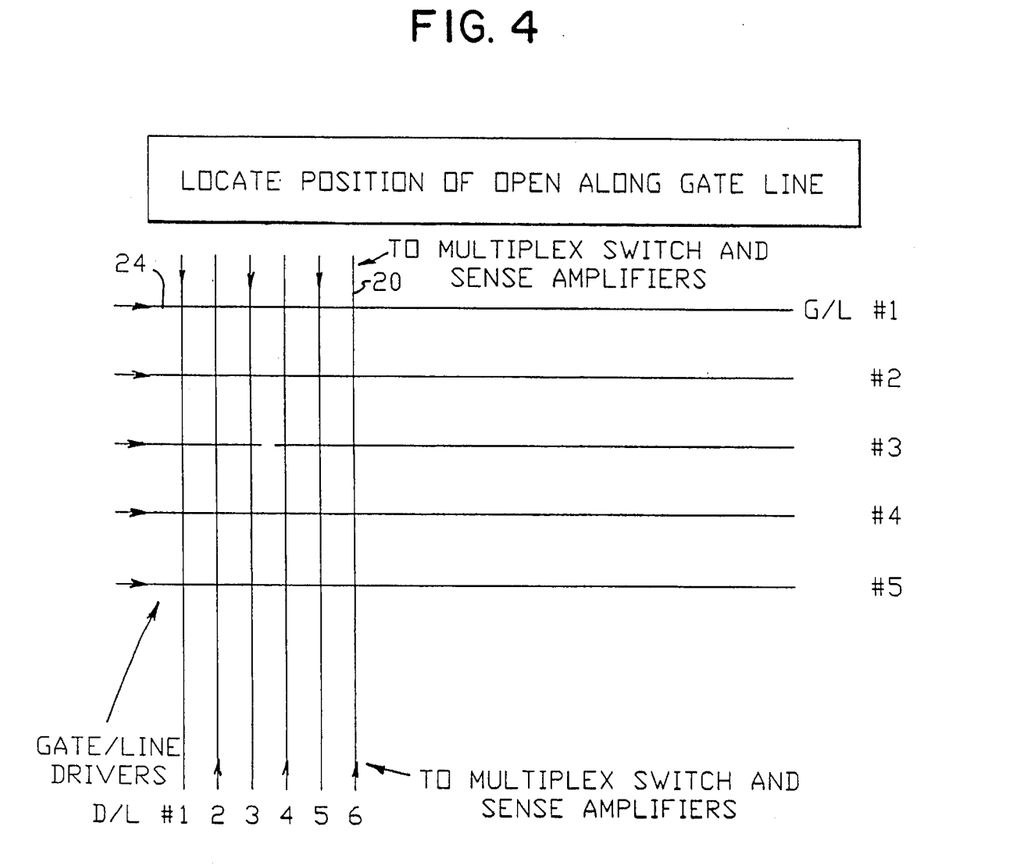
FIG. 4 illustrates a method of locating opens in gate lines of the array of FIG. 2.

Referring to FIG. 4, gate line 3 has been identified as having an open by the method described above with reference to FIG. 3. Gate line pulse excitation is applied to gate line 3. The response on the various data lines, as determined by sense amplifiers connected through a multiplex switch as in the above mentioned U.S. patent is observed. A second gate line pulse for the next setting of the multiplex switch is applied and the responses of all sense amplifiers are stored. This procedure is continued until sensing has been dome for all data lines. The position where the response changes from normal to zero indicates the location of the open in the gate line in a manner analogous to that described above with respect to FIG. 3.

Referring to FIGS. 5 to FIG. 9, when a pulse is applied to one of the gate lines, a resulting pulse having a particular signature will appear on successive ones of the data lines. The pulse may be integrated using the sense circuits described in the above mentioned patent. The pulse, or preferably the integrated waveform resulting from the pulse, may be analyzed to obtain information concerning at least one of level of functionality of the TFT/LCD and quality of contact to the lines.

In order to test the TFT/LCD array it is important to evaluate whether there is a defect, and if so, the nature of the defect. One approach would be to digitize the entire waveform. This would be quite costly in terms of time to acquire data, memory required to store data, and time required for analysis of the data. Surprisingly, it has been found that the procedure can be automated by merely sampling the waveforms at various points in time. In particular, each of the waveforms can be sampled at a time A prior to the application of the gate pulse, a time B shortly thereafter, a time C at approximately the center of the gate pulse (after which substantially the entire voltage change has occurred in the case of the normal waveform illustrated in FIG. 5), a time D just before the end of the gate pulse, and a time E, shortly after the end of the gate pulse. Although this general description of the times is quite precise, the actual sampling times are subject to adjustment for various widths of gate pulses and for various designs of TFT/LCD arrays and in particular for various pixel designs. Further, it will be recognized that the times are chosen to facilitate the analysis which is performed, as described below with respect to FIG. 12.

Figure 10:
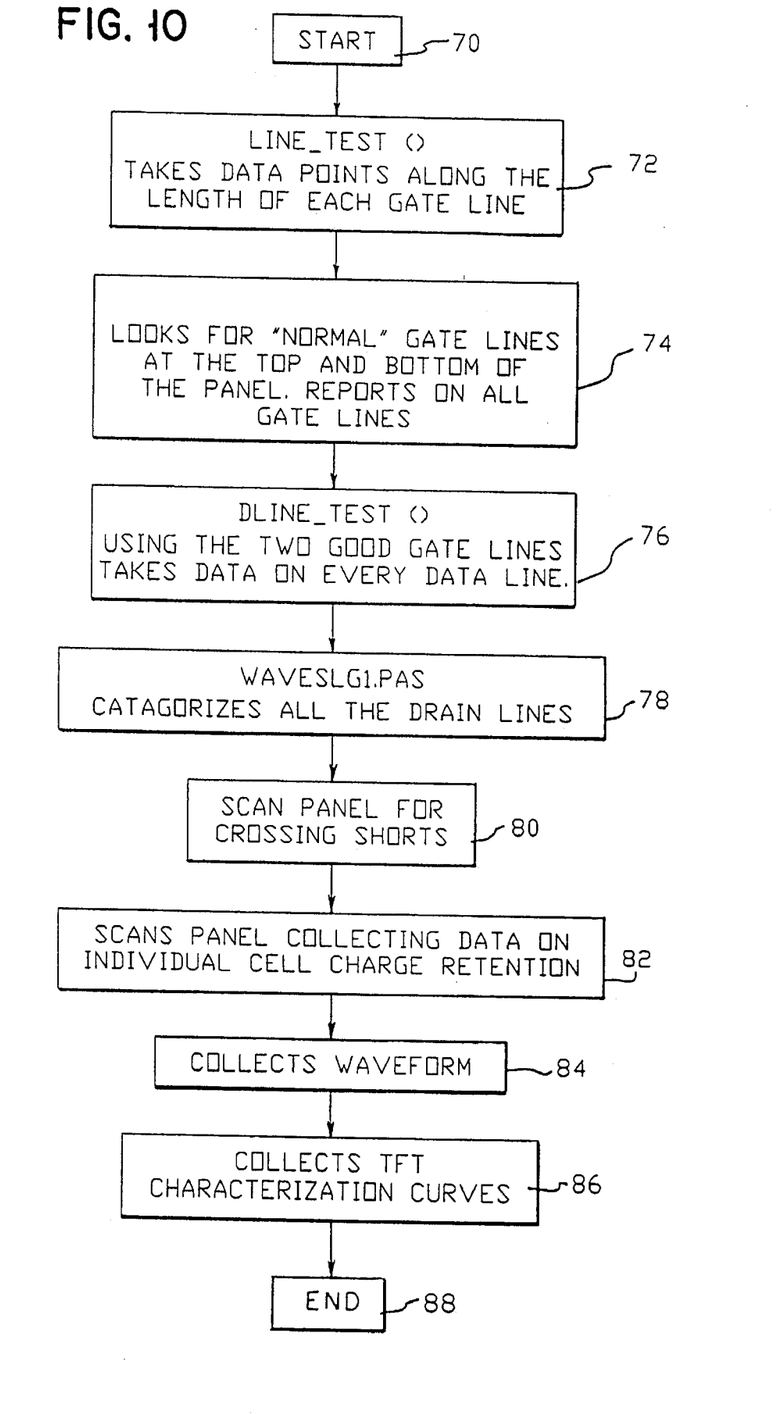
FIG. 10 is a generalized flow chart for the process of testing an array of the type shown in FIG. 2.

Referring to FIG. 10 the generalized sequence for testing a TFT/LCD array is shown. When computer 52 receives a start command at step 70 the program advances to step 72 where a line test is performed. Data points are taken along the length of each gate line. At step 74 a search is made for normal gate lines at the top and bottom of the panel. However, data is taken and stored for all gate lines. At step 76 the two gate lines having integrity are used to obtain data on every data line. At step 78 the data that is obtained is utilized to characterize the data lines. Waveforms of the type illustrated in FIG. 5 through FIG. 9 are obtained and analyzed in the manner more fully set forth below with respect to FIG. 12.

At step 80 the panel is scanned for crossing shorts. In the case of a short, waveforms of the type represented by FIG. 8 will be present, but the voltage drop will be much more pronounced. By comparing the voltage at point A and point E, and noting a large difference the presence of a short is detected. It is advantageous to perform this early in the overall test sequence for a TFT/LCD array. If a sizable number of shorts are present, the array may be deemed defective immediately, and testing may be terminated.

At step 82 the panel is scanned to collect data on cell charge retention of the individual cells. The manner in which this is done is more fully explained with reference to FIG. 11.

At step 84 waveforms for the individual cells are collected. At step 86 tests are performed to obtain characterization curves for the thin film transistors. The manner in which steps 84 and 86 are performed is fully described with reference to the above mentioned U.S. patent.

At step 88 testing for a given TFT/LCD array is complete. The substrate is removed from the tester. A new substrate 10 having a TFT/LCD array to be tested is then placed on substrate holder 14 (FIG. 1). At receipt of the appropriate command by computer 52 the test sequence is repeated, starting at step 70, for the new substrate.

Figure 11:
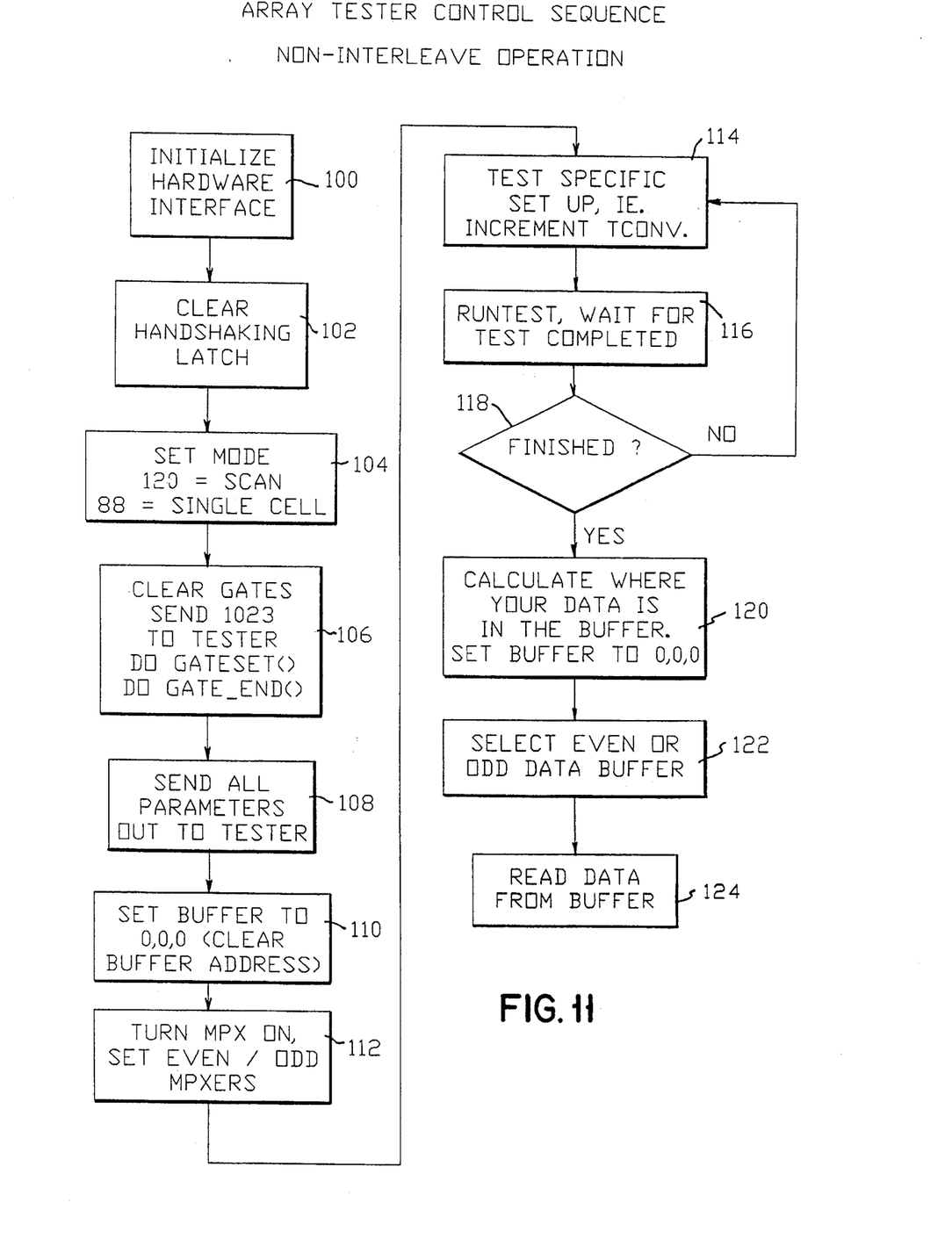
FIG. 11 is a flow chart illustrating the control sequence for the apparatus in FIG. 1.

FIG. 11 illustrates the control sequence for the apparatus of FIG. 1 which is accomplished under the program of FIG. 10. At step 100 all outputs from digital interface board 54 (FIG. 1) to test controller 46 are initialized by being set equal to a given logic level (for example, a logic zero state). At step 102, a so-called hand shaking latch in test controller 46 is cleared. This hand shaking latch is responsive to a register which an be reset only by software so that the hardware and software are kept in synchronization and so that functions can be performed in the hardware while other operations occur in the software.

Step 104 is a mode selection step. If a so called single cell mode is selected (steps 84 and 86 in FIG. 10) repeated measurements are generated on a single pixel. A family of curves may be generated or waveforms may be analyzed. If a so called scan mode is selected, every time a test is performed (a reading taken), the gate line number under test is incremented by 1. The scan mode would be used, for example, for a test such as checking charge retention on every cell on the panel. Because of the automatic sequencing through the gate lines it is unnecessary to manually select the gate lines in the scan mode.

At step 106 logic operations are conducted to clear all data out of the shift registers which drive the gate lines. A sub-routine entitled "do gateset" then increments a logic 1 signal through the shift register either automatically if the scan mode of step 104 is selected or to the proper position so that a pulse is applied to the correct gate line if the single cell mode is selected. Another sub routine entitled "do gate end" then confirms that the proper gate line has been activated by examining the hand shaking latch, thus assuring completion of this process before a test is begun.

At step 108 all test parameters that have been selected by using computer 52 are sent out to test controller 46 by operation of digital interface board 54 and transmission by bus 50. These values are latched into the appropriate registers by control test controller 46.

At step 110 an address in a memory buffer in test controller 46 is set to a value of 000 in preparation for running a test.

At step 112 the appropriate multiplexer are turned on in preparation for running a test. As a result, even and odd data line drivers and respective sense circuits of the type described in the above mentioned patent are selected.

Step 100 through step 112 are generic to almost every type of test that can be run. However, at step 114 a specific type of test is selected. For example, if a waveform test is to be conducted to obtain waveforms of the type illustrated in FIG. 5 through FIG. 9, it is necessary to specify the times at which an analog to digital converter is to be operated to sample the waveforms at the times A,B,C,D and E. Thus, a value Tconv., a sampling time, is sent to a latch in test controller 46. This may be the last piece of data required to specify the conditions necessary for performing the test.

At step 116 the test is actually run. All the required circuitry is activated, an appropriate gate pulses provided, the data voltage is turned on, readings are taken by the analog to digital converters, and the resulting digital data is stored in the memory buffer in the test controller. The actual nature of the test performed is described in detail in the above mentioned patent.

At step 118 a decision is made as to whether the test has been completed. If it has not, then the program branches back to step 114 where Tconv. is incremented and the test again run. The test is run repeatedly with Tconv. being incremented each time it is run to sample the entire waveform.

When a test is finished, branching to step 120 occurs. At step 120 a calculation is performed to determine where in the memory the desired data is stored. For a complete scan of the panel all of the data may be required. However, for an individual cell, since a number of cells are tested at the same time, only selected data may be required. The calculation at step 120 also determines whether the data is on an odd data buffer or an even data buffer. At step 122, in accordance with the calculation at step 120, an even or odd data buffer is selected. Finally, at step 124 data that is read from the data buffer passes via bus 50 and digital interface board 54 to computer 52.

Figure 12:
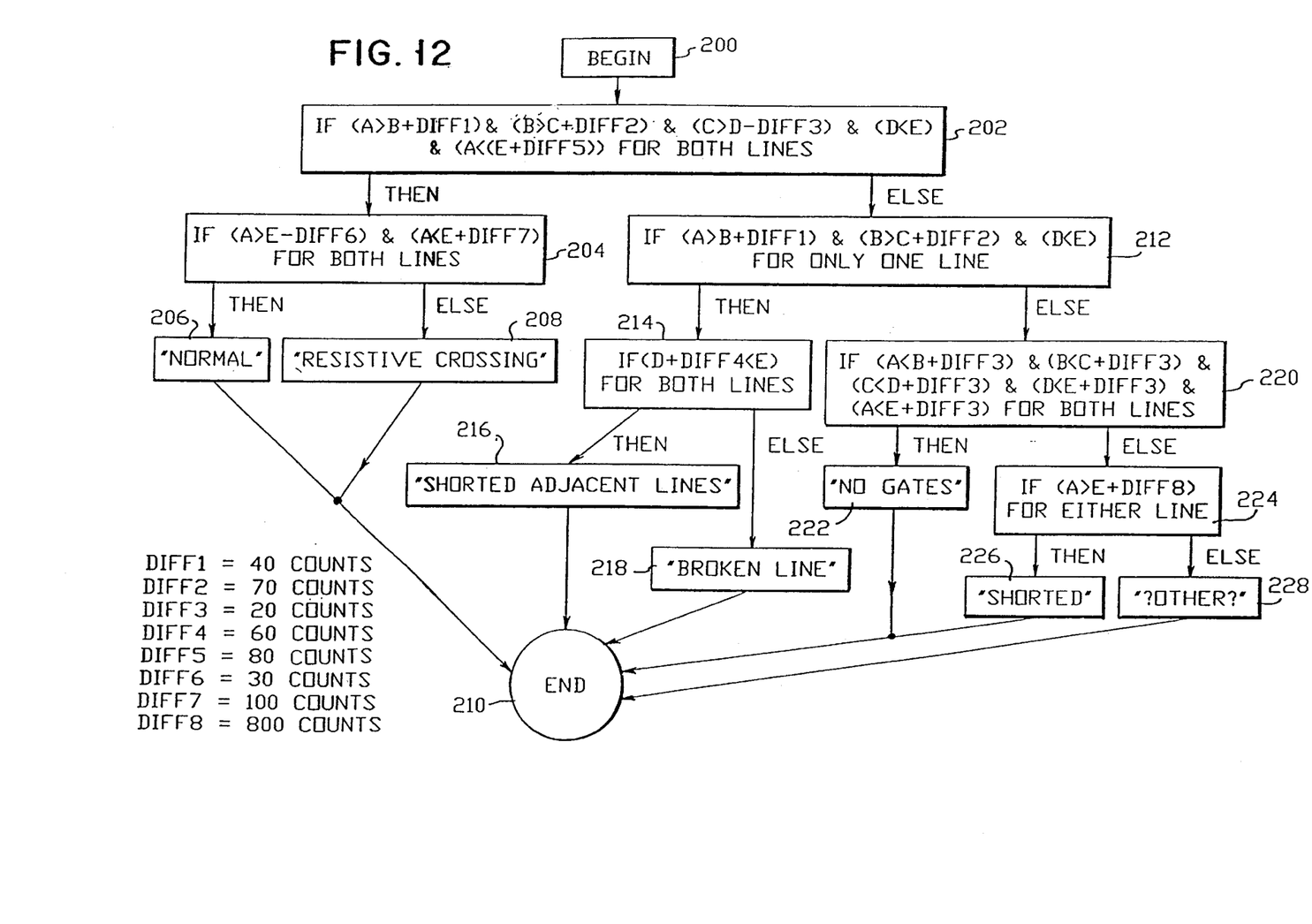
FIG. 12 is a flow chart useful in analyzing the wave forms in FIG. 5 to FIG. 8 to determine whether a defect is present and if so the nature of the defect.

FIG. 12 is a decision tree which, in accordance with the invention, is used to analyze the integrated waveforms obtained by the method outlined in the above mentioned U.S. patent. In general the types of waveforms which may be obtained are illustrated in FIG. 5 through FIG. 9. FIG. 12 is a detailed explanation of the implementation of step 78 of FIG. 10.

Referring to FIG. 12, mathematical expressions are in parentheses while the "&" symbol indicates a logical "and" operation. In order to simplify discussion, the letters A,B, C,D, and E are used to represent voltage levels at times A,B,C,D and E respectively. Differences in voltage levels are specified as Diff1, Diff2 . . . Diff8, and their values for a typical panel are specified in FIG. 12, where 1 count is equal to, for example, approximately 2.5 millivolts.

Figure 5:
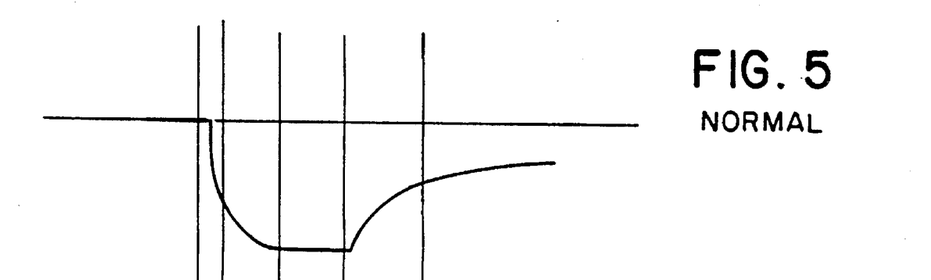
FIG. 5 is an array tester waveform which is characteristic of normal operation.
Figure 6:
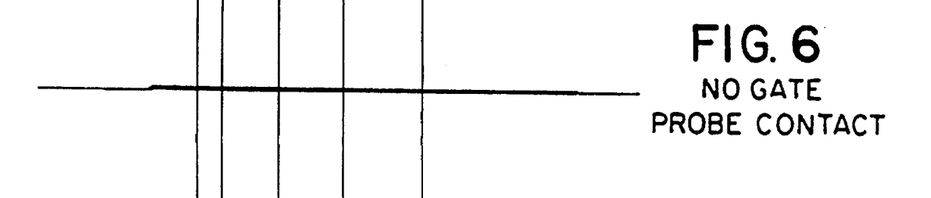
FIG. 6 is an array tester waveform which is characteristic of no gate contact.
Figure 7:
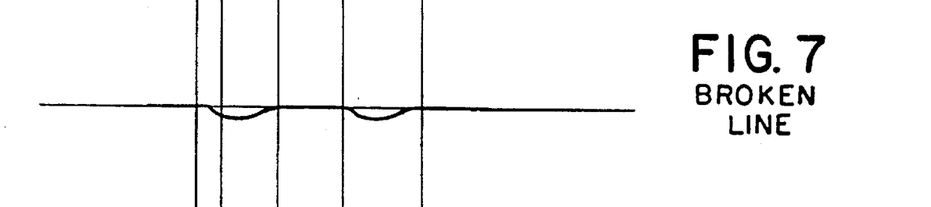
FIG. 7 is an array tester waveform which is characteristic of an open line.
Figure 8:
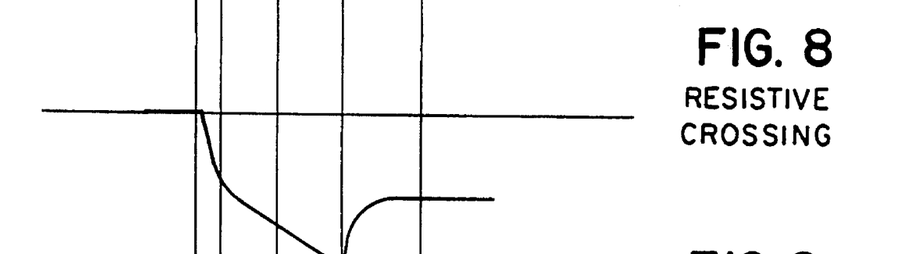
FIG. 8 is an array tester waveform which is characteristic of a resistive crossing defect.
Figure 9:
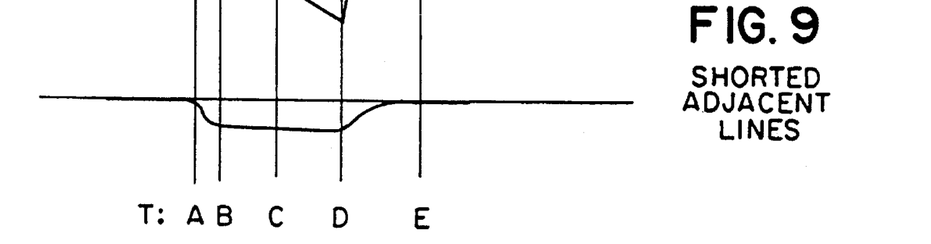
FIG. 9 is an array tester waveform which is characteristic of shorted adjacent lines.

Operations begin at step 200 when appropriate initializations of software occur. At step 202 an initial characterization of the waveform is conducted. It is based on the relationship of the voltage at points A,B,C,D and E. If the mathematical conditions set forth therein are met by data obtained from data lines associated with cells at both ends of a data line, then branching to step 204 occurs. In other words, there are five different conditions that must be met, for the two selected pixels, for branching to step 204 to occur. While differences Diff1, Diff2, . . . Diff8, used in FIG. 12 are all defined for the particular TFT/LCD array being tested, there are some general waveform characteristics which are required for operation to be deemed normal (FIG. 5). For example, in the normal case there should be a significant difference in voltage between point A and point B. More specifically, voltage at point A (A in this discussion) should be higher (more positive) then the voltage at point B (B in this discussion) by at least Diff1 (for example, 40 counts). B should be higher than C by at least Diff2 (for example, 70 counts). Thus, there should be an even steeper drop in voltage from point B to point C than from point A to point B. However, C need only be greater than D minus Diff3. In other words, the voltage between point C and point D should remain relatively constant, Further, the voltage at point D should be less than the voltage at point E. Finally, the voltage at point A should be less than the voltage at point E plus Diff5 (for example, 80 counts).

At step 204 two additional checks are conducted for both lines. First, A must exceed E minus Diff6 (for example, a relatively small change of 30 counts). In addition, A must be smaller than E plus Diff7 (100 counts). If both of these conditions are met, branching to step 20 occurs, the signal is deemed to be normal and analysis for that waveform is terminated at step 210. However, if the conditions of step 204 are not satisfied the program branches to step 208. The waveform is identified as that of FIG. 8, which is characteristic of a resistive crossing, a condition wherein there is a relatively high impedance short between a gate line and a data line. Analysis then terminates at step 210.

If the conditions at step 202 are not satisfied for both lines, then branching to step 212 occurs. At step 212 if the first two conditions and the fourth conditions of the five specified in step 202 are satisfied for only one line then branching to step 214 occurs. At step 214 a determination is made as to whether D plus Diff4 (for example 60 counts) is less than E.

If this is the case for both lines then branching to step 216 occurs. The decision tree had led to an identification of the waveform of FIG. 9 and this is deemed to be an indication of shortened adjacent data lines. Analysis is terminated at step 210.

If the condition of step 214 is not satisfied for both lines, then branching to step 218 occurs. The waveform of FIG. 7 has been identified indicating a broken data line. Analysis is terminated at step 210.

If the conditions specified in step 212 are not satisfied for at least one line, then branching to step 220 occurs. There are five conditions that are checked at step 220. These are whether A is less than B plus Diff3 (20 counts), B is less than C plus Diff3 (60 counts), C is less than D plus Diff3, D is less than E plus Diff3 and A is less than E plus Diff3. If these conditions exist for both lines, then branching to step 222 occurs. This is indicative of the essentially flat waveform of FIG. 6, thus indicating that there is no contact of the respective gate pad by the gate probe. This condition having been identified, analysis terminates at step 210.

If at step 220 all five conditions are not satisfied for both lines than branching to step 224 occurs. A test is made to determine whether A is greater than E plus Diff8 (800 counts) for either line. If this is the case, then branching to step 226 occurs and the presence of a short is indicated, as described above with respect to step 80 of FIG. 10. Analysis is then terminated at step 210.

Assuming that the condition specified in step 224 is not met for either line then branching to step 228 occurs. This indicates a waveform other than those illustrated in FIG. 5 through FIG. 9 has been encountered. This type of unknown waveform is treated as indicative of a defect until it is investigated manually and a determination made as to whether it constitutes an acceptable deviation or requires that the TFT/LCD array be regarded as defective.

Thus, the flow chart representative of the decision tree used in FIG. 12 provides an extremely efficient way to characterize the possible waveforms received from the sense circuits. Since the waveforms are sampled at only a few points, the analysis is performed in a simple and straightforward manner.

Operationally testing all pixels in a display as taught above is slow because each cell in turn is required to hold charge a frame time (16.7 msec) before it is sampled. Even using multiple sense channels to test a set of pixels along a selected gate line, this wait means minutes per array. For example, the time required to sequentially perform a single write-hold-read cycle for every pixel in a VGA display (480×640×3) using 120 sense channels is over 2 minutes, and many tests require multiple cycles. An entire array may be tested 10 to 100 times faster, fast enough for practical production line use, in the manner set forth below.

As explained in the above mentioned patent, the array tester writes charge on a pixel's storage capacitor by pulsing a gate line while holding the data line at a specified voltage above ground potential. Then, after a period of time referred to as the hold time $T_H$ it reads charge from the pixel capacitance by pulsing the gate line while integrating the data line current in a sense integrator. The hold period is necessary to test for charge leakage. The final value of the integrator has a known relationship to the cell charge. When all pixels are tested sequentially, the write pulse for gate line $G_{n+1}$ cannot begin until after the read pulse on gate line $G_n$.

Figure 13:
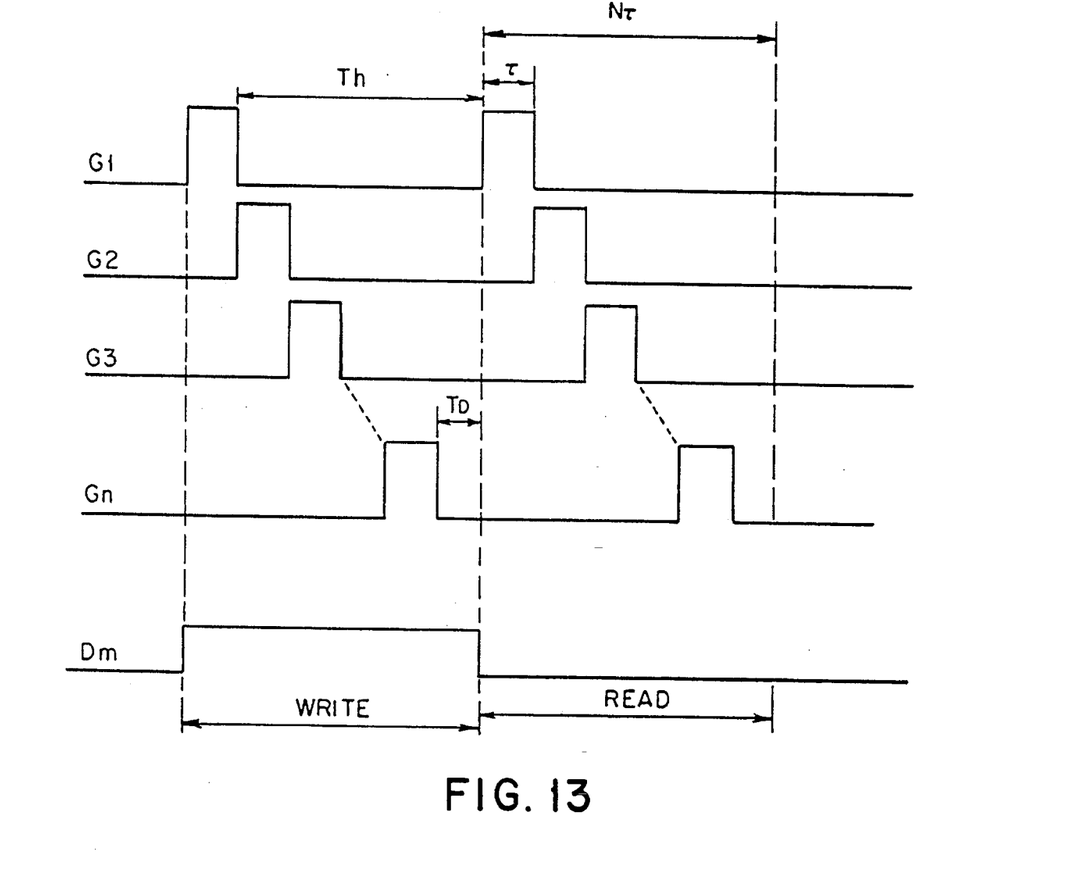
FIG. 13 is a generalized timing diagram indicative of operation using interleave timing.

The sequence of simple write-hold-read in which multiple write-read cycles are performed is changed during the hold time by interleaving a number of writes with the same number of reads. The timing for this is shown in FIG. 13. A number N of write operations are performed, and the, after a hold time $T_H$, the same N cells are read in the same sequence as they were written. Assuming the write time and read time are equal to $\tau$, then $N\tau+T_D=T_H$, where $T_D$ is an appropriate delay and may be zero. Usually, the hold time $T_H$ is equal to the frame time (commonly 16.7 ms), but this is not necessary. The equation above determines the number N sets that can be written within a holding time $T_H$. Finally, it is necessary to provide a buffer architecture so that the charge data can be stored without interruption, allowing the tester to maintain a constant write to read time interval.

Charge is read from the first set of pixels at exactly a time $T_H$ after they were written, and so on until all N sets are read. Each time the charges are read from a set of pixels along a selected gate line, they are placed in the data buffer. After the first block of N sets has been placed in the buffer, the buffer's contents are transferred to a storage medium over a high data rate path. Testing an entire array proceeds by testing the first block of N sets, followed by the second block, and so on until all gate lines have been assessed.

A command from computer 52 (FIG. 1) initiates the charge writing sequence followed by a charge-reading sequence for the first N sets. Data from the integrators is converted to digital form and placed in the data buffer. The buffer size (in bytes) S=B×N×C, where B is the number of bytes required to store the reading from one cell, and C is the number of sense channels operating in parallel. The hardware is designed to independently transfer data from the data buffer and write charge to the pixels so that buffer data can be transferred to computer 52 while the next write operation proceeds simultaneously. The charge in the second block of N sets is then ready to be read, placed in the buffer, and then transferred to computer 52.

Figure 14:
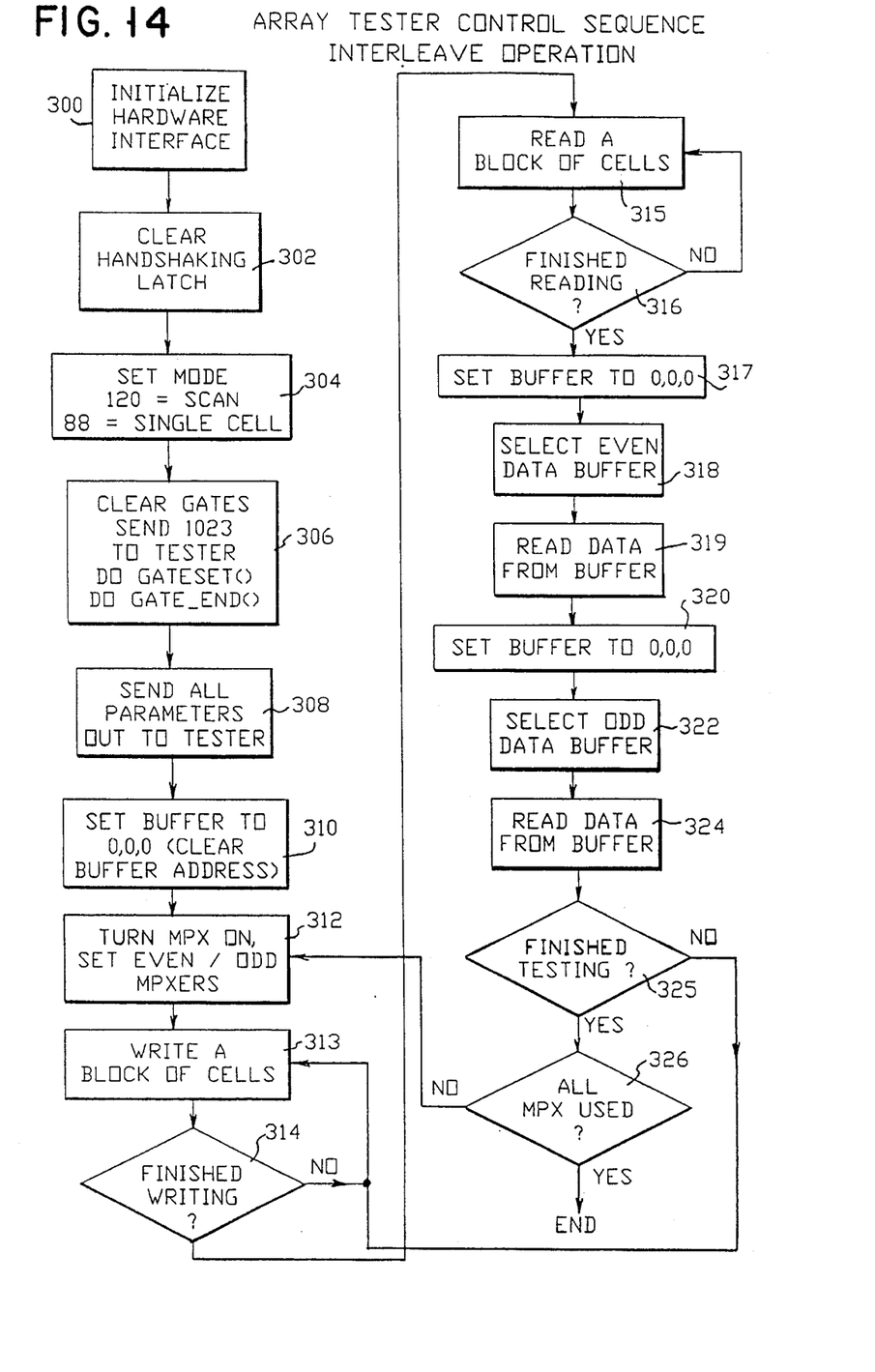
FIG. 14 is a flow chart similar to FIG. 11, for operation using interleave timing.

Referring to FIG. 14 the control sequence for interleaved operation is described unless otherwise described below, like reference numerals, that is numerals higher in value by 200 than those used in FIG. 11, represent corresponding operations. For these steps no additional description is provided below.

At step 313 writing or transferring a charge to a block of cells is begun. At step 314 a determination is made as to whether a desired number of gates have been activated so as to complete the block. If the block has not been completed, then the program branches back to step 313. Upon completion of the block the program branches back to step 315.

It is noted that for interleaving as part of the operations conducted at step 308 a parameter is supplied from computer 52 to the test controller 46 to specify the number of gate lines to be activated in a block.

At step 315, charge that has been written into the cells of the block selected during step 313 is then "read" and the appropriate data is stored in a buffer. At step 316 a determination is made as to whether or not the entire block has been read and the data stored. If the read operation is not finished the program branches back to step 315.

Upon completion of the reading and storing operation the program branches to step 317 where the buffer address is set to 000.

At step 318 the even data buffer is selected. At step 319 data from that buffer is read into computer 52.

At step 322 the odd data buffer is selected. At step 324 data is read from the odd data buffer into computer 52.

At step 325 a determination is made as to whether all the blocks have been tested. If all the blocks have not been tested, the program branches back to step 313 and the sequence of step 313 to step 325 is repeated. This occurs for the number of blocks required to test the entire array.

At step 326 a determination is made as to whether all multiplexers switch positions have been used for testing. If all positions have not been used, the program branches to step 312, another multiplexer is used and the test sequence beginning at step 313 and ending at step 326 is repeated. This occurs for a number of times equal to the number of positions of the multiplexer. When all positions of the multiplexer have been used the test sequence ends.

While the invention has been particularly shown and described with respect to preferred embodiments thereof, it will be understood by those skilled in the art that changes in form and details may be made therein without departing from the scope and spirit of the invention.

We claim:

1. An apparatus for testing for and classifying defects in a TFT/LCD array having ate liners and data lines comprising:

means for activating cells of the array by applying gate pulses to said gate lines and pulses to said data lines;

means for acquiring waveforms from data lines of said array;

means for sampling the waveforms at selected points in time; and means for classifying the waveforms to indicate at least one of whether defects are present and the nature of said defects by comparing voltages of the waveform at said selected points in time.

2. The apparatus of claim 1 wherein said means for sampling the waveforms includes selection means for selecting five points in time at which said waveforms are sampled.

3. The apparatus of claim 2 wherein said five points are selected to be prior to a gate pulse, after commencement of the gate pulse, substantially at a center of the gate pulse, prior to ending the gate pulse, and after ending the gate pulse.

4. The apparatus of claim 1 wherein the array is tested by placing charge in successive blocks of the array, and reading each block before writing into a next successive block.

* * * * *